United States Patent
Kumar

(10) Patent No.: US 10,956,242 B1
(45) Date of Patent: Mar. 23, 2021

(54) AUTOMATING THE MIGRATION OF WEB SERVICE IMPLEMENTATIONS TO A SERVICE PROVIDER SYSTEM

(71) Applicant: Amazon Technologies, Inc., Seattle, WA (US)

(72) Inventor: Sagar Kumar, Mountain View, CA (US)

(73) Assignee: Amazon Technologies, Inc., Seattle, WA (US)

(*) Notice: Subject to any disclaimer, the term of this patent is extended or adjusted under 35 U.S.C. 154(b) by 282 days.

(21) Appl. No.: 15/833,961

(22) Filed: Dec. 6, 2017

(51) Int. Cl.
*G06F 9/54* (2006.01)
*G06F 8/30* (2018.01)
*G06F 8/76* (2018.01)
*G06F 16/27* (2019.01)
*G06F 16/21* (2019.01)
*G06F 16/951* (2019.01)

(52) U.S. Cl.
CPC .............. *G06F 9/547* (2013.01); *G06F 8/30* (2013.01); *G06F 8/76* (2013.01); *G06F 16/214* (2019.01); *G06F 16/27* (2019.01); *G06F 16/951* (2019.01)

(58) Field of Classification Search
None
See application file for complete search history.

(56) References Cited

U.S. PATENT DOCUMENTS

| | | | |
|---|---|---|---|
| 9,817,732 B1* | 11/2017 | Fair | G06F 11/2007 |
| 2010/0250746 A1* | 9/2010 | Murase | G06F 9/50 |
| | | | 709/226 |
| 2011/0239231 A1* | 9/2011 | Brown | G06F 9/543 |
| | | | 719/328 |
| 2013/0086298 A1* | 4/2013 | Alanis | G06F 9/4856 |
| | | | 711/6 |
| 2016/0164722 A1* | 6/2016 | Zhu | G06F 16/27 |
| | | | 709/221 |
| 2016/0378713 A1* | 12/2016 | Kaimalettu | H04L 67/1008 |
| | | | 709/212 |
| 2017/0177311 A1* | 6/2017 | Kaulgud | G06F 8/20 |
| 2017/0195267 A1* | 7/2017 | Ghafourifar | H04L 51/066 |

\* cited by examiner

*Primary Examiner* — Umut Onat
(74) *Attorney, Agent, or Firm* — Nicholson De Vos Webster & Elliott LLP

(57) ABSTRACT

Techniques for automating the migration of a web service implementation to a service provider system are described. The automated migration of a web service implementation to a service provider system can include the migration of an API specification to an API gateway service, the migration of source code to a virtual compute service, and optionally the migration of other web service components to other services provided by the service provider system. The migrated web service can be accessed at the service provider system using a URL or other identifier generated by the service provider system. In this manner, the external functional behavior of the web service can remain the same while internally taking advantage of the benefits offered by services of a service provider system.

20 Claims, 7 Drawing Sheets

AUTOMATING THE MIGRATION OF WEB SERVICE IMPLEMENTATIONS TO A SERVICE PROVIDER SYSTEM

BACKGROUND

As an increasing number of applications and services are being made available over networks such as the internet, an increasing number of content, application, and service providers are turning to technologies such as cloud computing. Cloud computing, in general, is an approach to providing access to electronic resources through services, such as web services, where the hardware and software used to provide those services is dynamically scalable to meet the needs of users of the services at any given time. A user (or "customer") typically rents, leases, or otherwise pays for access to resources provided by a service provider's system and thus can avoid purchasing and maintaining the underlying hardware and software at a customer's site.

In this context, many cloud computing service providers use virtualization and multi-tenant architectures to allow multiple users to share the service provider's underlying hardware and software resources. Virtualization allows servers, storage devices, and other hardware resources to be partitioned into multiple isolated instances that can be assigned to and used by many different users. Multiple users can concurrently use a cloud computing provider's resources thereby increasing the number of users a service provider can support and reducing the management and financial costs to both the service provider and its customers.

BRIEF DESCRIPTION OF DRAWINGS

Various embodiments in accordance with the present disclosure will be described with reference to the drawings, in which.

DETAILED DESCRIPTION

Figure 1:
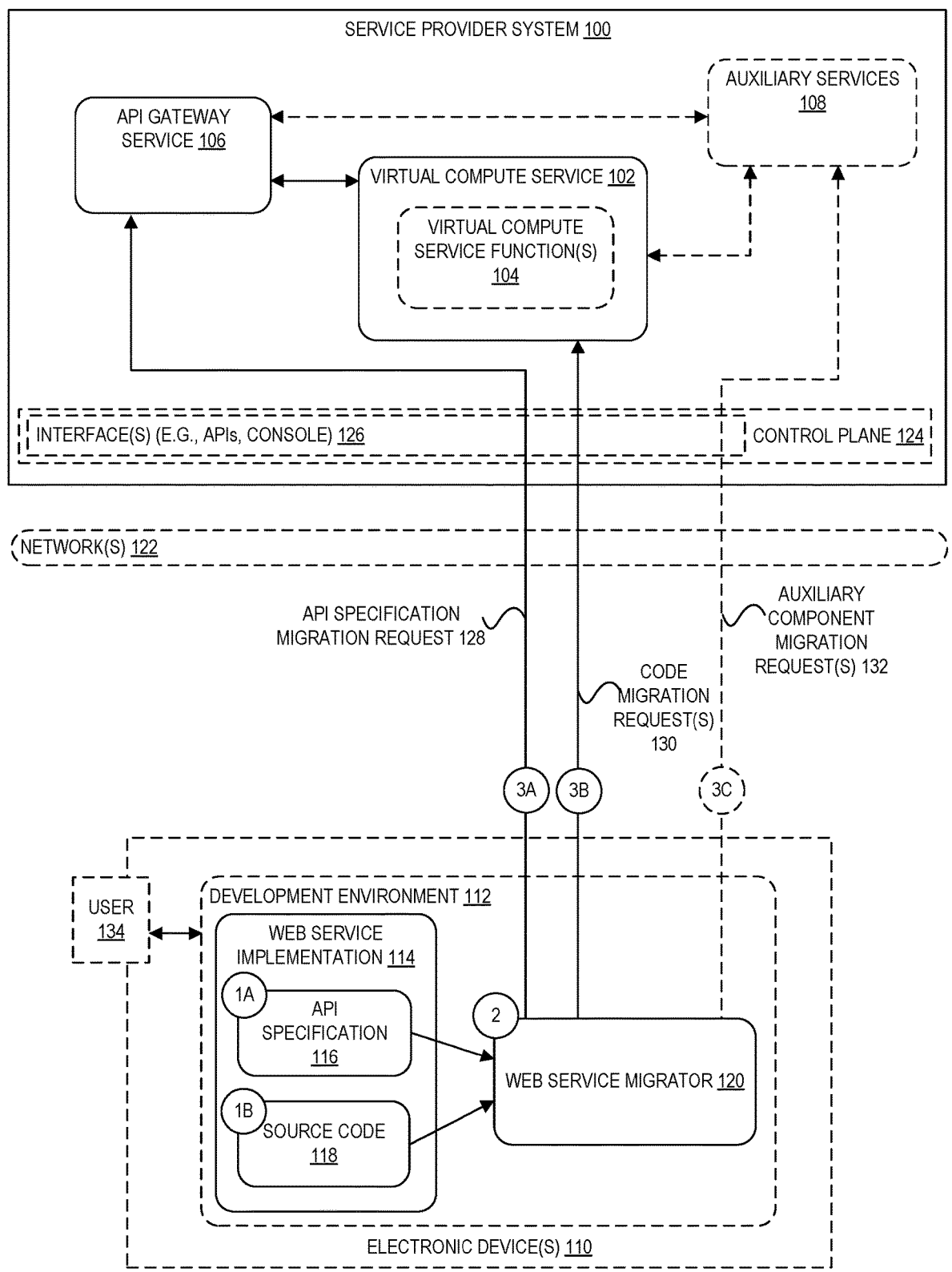
FIG. 1 is a diagram illustrating an environment including components used to migrate a web service implementation, including computer program code and other metadata defining the operation of the web service, to an execution environment provided by a service provider system, according to some embodiments.

Various embodiments of methods, apparatuses, systems, and non-transitory computer-readable media enable the automated migration of computer program code and other metadata defining a web service implementation to an execution environment provided by a computing resource service provider (commonly referred to as a "cloud computing" service provider). At a high level, a web service implementation can include metadata specifying an application programming interface (API) for accessing resources managed by the web service, code defining a backend implementation of the web service (that is, the "business logic" and other operations of the web service), and possibly other ancillary resources supporting the web service implementation including databases, data storage resources, and so forth. A web service generally provides applications with programmatic access to the resources managed by the web service, where access to the resources is controlled via defined API endpoints identifying the resources. For example, a web service designed to provide access to weather report information might include an API endpoint defined by the path "/weather" and corresponding to a resource representing a weather report for a geographic location. An application sending a request the "/weather" endpoint, for example, may cause the web service to perform one or more operations to provide weather report-related data to the requesting application. The resources managed by a web service can include any type of data object and the web service's backend implementation can include any type of operations performed in response to requests received at the defined API endpoints.

Software developers today typically use a software development environment, such as an integrated development environment (IDE), source code editor, or other similar application to create the code and metadata defining a web service implementation. The development of web services may further include the use of an API development tool that assists users in creating an API specification (for example, as a JAVASCRIPT® Object Notation (JSON) or YAML Ain't Markup Language (YAML) file) and that can automatically generate source code based on a defined API specification. A developer can further modify such automatically generated source code to incorporate additional business logic so that the web service operates as desired. A complete web service implementation may then be deployed to locally provisioned and managed servers or to computing resources provisioned and managed at a service provider system.

Users may desire to migrate a web service implementation, which may initially be designed to operate in a locally managed execution environment as described above, to an execution environment provided by a service provider system. The desire to migrate a web service implementation to a service provider system may be driven, for example, by the many benefits provided by a service provider system including availability, scalability, and processing power. According to embodiments described herein, the automated migration of a web service implementation to a service provider system is enabled by a new migration component that may be implemented, for example, as a plug-in to a developer's software development environment, as a migration service of a service provider system, as a standalone application, or any combination thereof. For example, the automated migration of a web service implementation to a service provider system may be performed by a plug-in to an IDE (for example, an IDE running within a developer's local computing environment or a remote IDE provided as a service by a service provider system), a service provider system service, or any other process having access to the code and metadata defining a web service implementation. In an embodiment, this migration component can receive input requesting the migration of a web service implementation and, in response, perform operations to automate the migration of components of the web service implementation to an execution environment provided by a service provider system.

In some embodiments, the automated migration of a web service implementation to a service provider system can include migrating metadata defining an API for the web service to an application programming interface (API) gateway service provided by the service provider system. As indicated above, the development of web services today often involves creating an API specification for the web service, for example, by creating an API configuration file based on the Open API standard or other standard. These API specifications can be used to describe components of an API including available endpoints (referring again to the example above, a "/weather" endpoint might be defined for a web service providing weather-related information via a "weather" resource), operations on each endpoint (for example, "GET/weather," "POST/weather" to define operations for receiving a weather report or updating a weather report, respectively), input and output parameters for each operation, authentication methods, and so forth. An API specification is typically programming language-agnostic and enables applications to discover and understand the capabilities of a web service without reference to the source code, documentation, or other resources. As one example, an API specification can be used by source code generation tools to automatically generate server-side and client-side source code in various programming languages based on the specification to assist with the web service development process, among other uses.

In some embodiments, the migration of a web service implementation can further include the migration of some or all of the associated code to a "serverless" execution environment provided by a service provider system. For example, a service provider system may provide a serverless execution environment as a virtual compute service which enables users to provide code to the service for execution without the users needing to provision or manage the computing resources—servers, memory, operating systems, runtime environments, and so forth—used to execute the code. Code provided to such a virtual compute service can be caused to execute, or be "invoked," in a number of ways including, for example, in response to event messages or requests to invoke execution of the code sent by external services or applications. In some embodiments, the migration of a web service implementation to a service provider system further involves configuring the API gateway service, the virtual compute service, or both, to direct requests received at particular endpoints (for example, at the "/weather" endpoint for the example weather report web service) to the appropriate business logic (for example, to executable code specifying actions related to the generation of a weather report data object). In other embodiments, the migration of code associated with a web service implementation to a service provider system can include using other types of computing resource virtualization services, such as the use of a container service or other hardware virtualization service of the service provider system, to host the portions of the web service implementing the business logic.

As indicated above, the migration of a web service implementation to a service provider system involves the creation of endpoints at an API gateway service replicating the endpoints defined by the API specification and the replication of the functionality of the backend business logic of the web service by various services of the service provider system. By migrating a web service implementation to a service provider system in this manner, the external functional behavior of the web service can remain the same (that is, applications can access the migrated web service in a similar manner to that used to access the pre-migrated web service) while internally taking advantage of the benefits offered by a service provider system. Software developers thus can make use of various services offered by service provider systems on web service implementations developed using existing development environment tools and without the need to recreate the web services at the service provider system from scratch. Furthermore, the performance of web services migrated to a service provider system can be improved by enabling the web services to take advantage of the availability, scaling, and other performance benefits of a service provider system.

As indicated above, in recent years, organizations have begun to realize the benefits of moving their computing resources—for example, servers, data storage, networks, and applications—out of their existing on-premises data centers and into systems managed by third-party service providers. These service provider systems typically provide a wide variety of configurable computing resources that can be provisioned and accessed over the internet, often using a "pay-as-you-go" or similar payment model. The ability to readily obtain such computing resources from these service providers eases many of the burdens organizations face in managing on-premises data centers which tend to be expensive to maintain and frequently encounter scalability and resiliency issues.

A common type of computing resource offered by these types of service providers is compute capacity, which is typically purchased by customers in the form of virtual computing resources, or virtual machine (VM) instances. These VM instances, which are hosted by a service provider on physical computing devices with their own operating systems and other software components, can be used in much the same manner as physical computers. As one example use of such compute capacity, computer programmers can use VM instances provisioned at a service provider system to host developed software applications, such as web or mobile applications.

Today, the development of web services still largely occurs in the context of server-based execution environments provisioned and managed by web service developers. For example, if a software developer desires to create a web service providing weather report information for requested geographic locations, the developer might create the source code for the web service and typically may be responsible for building and deploying the source code for execution on one or more servers (for example, either on locally managed servers or on servers that the user obtains and configures at a service provider system). As the size, complexity, and traffic demands of a web service grows, the developer or other IT support may be responsible for provisioning, managing, and scaling an increasing number of servers used to support the web service's operation. On the other hand, if a web service experiences only infrequent or sporadic traffic, the developer may be responsible for provisioning and supporting servers on a continuous basis for only a small amount of traffic to ensure that the web service is available when requested.

Even when VM instances from a service provider are used to ease some of these server management burdens, a web service developer typically must still decide how many and what type of VM instances to purchase, and how long to keep the VM instances in operation. For example, the costs of using the VM instances provided by service providers may vary depending on the type of instances and number of hours the instances are used. Developers or other IT support typically must also specify the hardware and software resources (for example, type of operating systems and language runtimes, and so forth) to install on the VMs. Other concerns may include over-utilization (that is, acquiring insufficient computing resources resulting in performance issues), under-utilization (that is, acquiring more computing resources than necessary and thus overpaying), and resource scaling as performance demands change over time. As indicated above, a web service's usage patterns may be difficult to predict and may increase or decrease over time.

To simplify some aspects of the web service software development process, some service providers today provide so-called "serverless" code execution environments offered as virtual compute services. In the present disclosure, a virtual compute service refers generally to a service which is able to automatically provision and manage computing resources used to execute program code on behalf of a user, thereby enabling software developers to build and execute software applications without needing to be aware of the computing resources used to execute the underlying source code. Using a virtual compute service, for example, software developers can focus on the operation of code instead of provisioning and managing computing resources used to run the code. To further simply the development of web services and other applications, some service provider systems also are providing API gateway services that enable API endpoints to be defined at and managed by a service provider system, further reducing the complexity of web service implementation resources to be managed directly by the user.

Although such API gateway services and virtual compute services are available to software developers today, most existing web services are still created with a locally managed, server-based execution environment in mind. Thus, if a software developer desires to make use of these and other services of a service provider system to support execution of an existing web service, the developer currently has the option to recreate the web service from scratch at the service provider system. However, this process often can be error-prone and require a significant amount of manual work. Furthermore, a software developer may be comfortable using existing software development tools to create web services and desire to continue developing web services as the developer has in the past. To improve the process of migrating a web service to a service provider system, embodiments described herein provide ways to automate the migration of web service implementation to various service offered by a service provider system.

For example, consider again a software developer who has created a web service providing access to weather report-related information, where the service is designed initially to execute in a local execution environment managed by the developer. As indicated above, the developer may typically create an API specification for the web service, write the source code used to implement the business logic, set up an operating environment in which the web service will execute (including, for example, one or more servers, operating systems, runtime environments, and so forth), and use various tools to build and deploy the web service to the environment. According to embodiments described herein, if a developer of the web service implementation desires to migrate the web service to a service provider system, the developer is able to request the migration and the migration process is performed automatically without further user involvement. For example, in some embodiments, a plug-in to an IDE, source code editor, build and deploy tool, or another standalone process, can analyze a web service implementation and automatically cause the web service to be replicated at the service provider system.

FIG. 1 is a block diagram illustrating an environment including components used to automatically migrate a web service implementation, including computer program code and metadata defining the web service, to a service provider system, according to some embodiments. In an embodiment, a virtual compute service 102, an API gateway service 106, and possibly other auxiliary services 108 operate as part of a service provider system 100 and comprise one or more software modules executed by one or more electronic devices at one or more data centers and geographic locations. A user 134 using one or more electronic device(s) 110 (which may be part of or separate from the service provider system 100) can interact with the service provider system 100 via one or more networks 122, such as the internet. In an embodiment, a web service migrator 120 performs operations to automate the migration of a web service implementation 114 to components of a service provider system 100 such that the web service can operate at the service provider system 100 instead of using computing resources locally provisioned and managed by a user 134.

A service provider system 100 provides users with the ability to use a variety of types of computing resources such as compute capacity (for example, executing VM instances, containers, batch jobs, code without provisioning servers), data storage resources (for example, object storage, block-level storage, data archival storage), network-related resources (for example, configuring virtual networks including groups of computing resources, content delivery networks (CDNs), Domain Name Services (DNS)), application resources (for example, databases, application build and deployment services), and so forth. These and other computing resources may be provided by a virtual compute service 102, an API gateway service 106, and auxiliary services 108, such as a hardware virtualization service that can execute compute instances, a storage virtualization service that can store data objects, and so forth. The customers of the service provider system 100 may use user accounts associated with a customer account, though these terms may be used somewhat interchangeably depending on context of use. Users may interact with a service provider system 100 across one or more networks 122 (for example, the internet) via one or more interfaces 126, which may include the use of application programming interface (API) calls, via a management console implemented via a website, or a standalone application. These interfaces 126 may be part of, or serve as a front-end to, a control plane 124 of the service provider system 100 that includes "backend" services supporting and enabling various services (for example, including the virtual compute service 102, API gateway service 106, and auxiliary services 108).

To provide these and other computing resource services, service provider systems 100 often rely upon virtualization techniques. For example, virtualization technologies can be used to provide users the ability to control and use compute instances (for example, a VM using a guest operating system that operates using a hypervisor that may or may not operate in a VM, an instance that can execute on "bare metal" hardware without an underlying hypervisor, and so forth), where one or more multiple compute instances can be implemented using a single electronic device. Thus, a user may directly utilize a compute instance hosted by the service provider system to perform a variety of computing tasks, or may indirectly utilize a compute instance by submitting code to be executed by the service provider system (for example, by submitting the code to a virtual compute service 102), which in turn utilizes a compute instance to execute the code (typically without the user having any control of or knowledge of the underlying compute instance(s) involved).

As indicated above, it has become desirable for some customers to migrate web service implementations, including program code and metadata which may have been initially written to execute in a locally managed server-based environment, to execution environments provided by service provider systems (for example, as provided by a service provider system 100). These customers may desire to migrate web service implementations for any of a number of benefits including increased scalability and stability, reduced management and infrastructure costs, and so forth.

In one embodiment, a virtual compute service 102 can host program code (for example, source code, binary code, or any other program code format) to be executed without the need for developers of the code to separately provision or manage the computing resources used to execute the code. A unit of code configured to run within a virtual compute service 102 may be referred to as a virtual compute service function (for example, virtual compute service function(s) 104). A virtual compute service function 104 includes program code defining the logic to execute when the function is invoked and, optionally, other resource parameters. Resource parameters can include other information related to the execution of the associated code such as, for example, an identifier of a runtime environment (such as "java8," "nodejs," "python3.6," or any other supported runtime environment), an amount of memory to allocate to the function, user roles or permissions to assign to the function, a function execution timeout, and so forth.

In some embodiments, a virtual compute service function 104 can be configured to execute in response to events (for example, events generated by an API gateway service 106, an auxiliary service 108, or by other applications internal or external to the service provider system 100) and the computing resources (compute capacity, memory, storage, and so forth) used to execute the function are managed by the service provider system 100. A virtual compute service function 104 can perform virtually any types of processing actions depending on the particular code defining the function. For example, virtual compute service functions 104 can be designed to perform business logic actions related to an API request received by an API gateway service 106, to retrieve and transform data (for example, data stored in a storage virtualization service or other location), to audit and report on API calls made to another auxiliary service 108, or used to perform any other processing tasks. A virtual compute service 102 may provide interfaces 126 (for example, web-based interfaces) that enable users or other processes to upload and configure code to be executed by the virtual compute service 102, to configure other metadata and resource parameters, to associate virtual compute service functions with triggering event sources (for example, API endpoints defined at an API gateway service 106), and so forth.

In an embodiment, a virtual compute service 102 can communicate with other components, for example, with electronic device(s) 110 internal or external to the service provider system 100, with an API gateway service 106, and with other auxiliary services 108 (which may include, for example, a storage service, a database service, a logging service, and so forth). In some embodiments, the electronic device(s) 110 and one or more of the auxiliary services 108 may be configured to generate event messages for processing by the virtual compute service 102. For example, requests received at endpoints configured by an API gateway service 106 can trigger the invocation of one or more virtual compute service functions 104 at the virtual compute service 102 by generating event messages accessible to the virtual compute service 102.

In one embodiment, the API gateway service 106 and auxiliary services 108 may be registered or configured to be polled or queried for events to trigger the execution of particular functions 104 at the virtual compute service 102. Such registration or configuration may be provided or enabled via the one or more interfaces 126 provided to the user electronic device(s) 110. For example, an interface 126 may provide options for the user to select or specify an API gateway service 106 or any of auxiliary services 108 as a triggering service such that events occurring at the triggering service may trigger generation of event messages, or such that the event triggering service may be periodically polled or queried for event messages such as by an intermediary polling system. In other embodiments, an API gateway service 106 or auxiliary service 108 can be configured as a triggering service programmatically, for example, in response to an API call from an application external to the virtual compute service 102.

In one embodiment, an event triggering service may be configured to associate an event or event type (for example, a call to a particular endpoint of the API gateway service 106) with one or more particular virtual compute service functions 104 to be executed by the virtual compute service 102 (that is, the event triggering service may store or have access to data which associates the event with the particular virtual compute service function 104). In another embodiment, the triggering service may not necessarily associate an event or event type with a particular virtual compute service function 104 to be executed by the virtual compute service but rather the event triggering service may generate event messages which the virtual compute service is configured to interpret as being associated with the virtual compute service function to be executed by the virtual compute service 102 (that is, the virtual compute service 102 may store or have access to data which associates the event with the particular virtual compute service function). In another embodiment, an intermediary system or service may be configured to handle interpretation and routing of event messages to execute the virtual compute service functions 104, such that neither the event triggering service nor the virtual compute service 102 may store or have access to the event-to-virtual compute service function association data. For example, an event triggering service or external application may generate an event message that is agnostic to any particular virtual compute service function 104 to be executed and the event message may be routed to the virtual compute service 102 (or an intermediary system) which evaluates the event message and associated metadata to determine which virtual compute service function 104 to execute in response and initiate a corresponding request to execute the virtual compute service function 104.

As indicated above, the API gateway service 106 and any of the auxiliary services 108 may be configured to operate as an event triggering service. These include but are not limited to: storage virtualization services, database services, message queue systems (for example, a message queue service provided by the virtual compute service, a message queue service provided by the service provider system, and so forth), logging services, compute resource management services, and so forth.

In an embodiment, users can use a virtual compute service 102 to execute code or other computing resources provided to the service. For example, a user may desire to run code in the connection with a web service that the user has developed. One way of executing the code is to acquire VM instances from a hardware virtualization service of a service provider system 100, configure the VM instances to suit the user's needs, and use the configured VM instances to run the code. Alternatively, the code or other computing resources can be provided to the virtual compute service 102 for execution in response to events. As yet another example, program code can be containerized and provided to a virtual compute service 102 to execute the web service code as a container. In an embodiment, a virtual compute service 102 can handle the acquisition and configuration of compute capacity (for example, VM instances, containers, and so forth) based on the code execution request, and execute the code using the acquired compute capacity. The virtual compute service 102 may automatically scale up and down based on the volume, thereby relieving the user from the burden of having to worry about over-utilization or under-utilization of the associated computing resources. In various embodiments, a virtual compute service 102 supports the execution of code written in one or more general-purpose programming languages (for example, JAVA®, PYTHON®, C#, and so forth) and may optionally support other domain-specific programming languages (possibly including, for example, a programming language specific to the virtual compute service 102).

In an embodiment, a virtual compute service 102 includes an interface 126 that receives and processes requests (sometimes in the form of event messages) to execute code (or any other type of executable computing resource) at the virtual compute service 102. In one embodiment, the interface 126 acts as an interface to the API gateway service 106 and auxiliary services 108 and to other requests to execute code (for example, based on requests to execute virtual compute service functions 104 sent from an application executing internally or externally to the service provider system 100).

In an embodiment, a virtual compute service function 104 may include code and associated dependencies and configuration data used by the virtual compute service 102 to execute the code in response to a request to invoke the function. As indicated above, the configuration data can include information indicating parameters related to desired amounts of computing resources to be made available to the serverless function during execution (for example, an amount of memory, an amount of CPU power, or both), a maximum execution time (for example, a number of minutes in which execution of the serverless function is to execute), security permissions, a handler method (a method in the serverless function source code where execution of the function is to begin), among other possible configurations.

According to embodiments described herein, the migration of a web service to a service provider system may begin with the creation of a web service implementation 114 using a development environment 112, including the creation of an API specification 116 and source code 118. For example, at the circles labeled "1A" and "1B," FIG. 1 shows an API specification 116 and source code 118 which may have been developed by a user 140 using a development environment 112. The development environment 112, for example, may comprise one or more of a source code editor, an integrated development environment (IDE), or any other application used to generate source code and an API specification. In some embodiments, the development environment 112 is locally hosted and managed by a user (for example, an IDE or other application running on a user's locally managed computing devices). In other embodiments, some or all of the development environment 112 includes components provided as services of a service provider system 100 (for example, an IDE, build and deploy tool, testing environment, and so forth, provided as services of a service provider system 100 and accessed remotely using a web browser, a thin client application, or other type of application). As indicated above, in typical software development environments, the user may use a development environment 112 to develop a web service and use a build and deploy tool to create an executable program(s) to be executed by one or more electronic devices provisioned and managed by the customer either locally or in the service provider system 100.

In an embodiment, the API specification 116 can include any type of metadata used to define various aspects of an API used to access a web service. For example, the API specification 116 can include the definition of available API endpoints (for example, a Uniform Resource Locator (URL) path or other identifier of a resource), operation parameters input and output for each operation, authentication methods, contact information, license, terms of use and other information. In some embodiments, the API specification can be formatted as a YAML Ain't Markup Language (YAML) or JAVASCRIPT® Object Notation (JSON) file and may conform to an API specification standard such as the Open API standard.

In the present disclosure, source code 118 may refer to any type of computer program source code (for example, source code representing a program, routines, subroutines, threads, and so forth) written in a programming language. The source code 118 may be executed to perform one or more specific actions, for example, related to the operation of a web service implementation 114 developed by the user 140. The source code 118 may be written in JAVA®, JAVASCRIPT®, PYTHON®, C#, RUBY®, or any other programming language. For some programming languages, a compiler is typically used to derive machine code from the source code—a form consisting of instructions that a computing device can directly execute. The machine code can also be stored for execution at a later time (for example, as an executable file). Alternatively, some types of source code 118 can be executed directly based on the source code with the aid of an interpreter application and without compiling the source code into a separate executable program. In some embodiments, source code 118 or portions thereof can be executed by a virtual compute service 102, for example, by providing the source code itself to the virtual compute service, providing machine code derived from the source code, providing a containerized application derived from the source code, or in any other format. Thus, references herein to execution of code can refer to any of execution of an executable program derived from the source code, execution of the source code directly, or other execution strategies depending on a particular programming language, build and deploy environment, execution environment used, and so forth.

In some embodiments, some of or all of the source code 118 can be generated by a code generation tool based on the API specification 116. The code generation tool may be part of the development environment 112 or a separate process running at electronic device(s) 110 or elsewhere. For example, a code generation tool can be used to generate "stub" source code based on the definition of API endpoints and other information provided in an API specification 116, the automatically generated code relieving the user from creating basic "plumbing" code used to handle requests to API endpoints and other basic operations of a web service. A user 134 can modify or supplement the generated stub code with additional source code defining additional business logic of the web service. For example, referring again to the example of a web service providing access to weather report-related resources, a code generation tool might generate stub source code used to handle requests received to defined endpoints (for example, a "/weather" endpoint) and the user 134 may create additional code defining actions to be performed when a request is received (for example, actions related to generating the data used to populate a weather report resource to be returned to the requesting process).

According to embodiments described herein, at circle "2," a web service migrator 120 can be used to automate the process of migrating a web service implementation 114 to a service provider system 100, including the migration of an API specification 116 to an API gateway service 106, the migration of source code 118 to a virtual compute service 102, and possibly the migration of other components of the web service implementation 114 to one or more auxiliary services 108. For example, the web service migrator 120 in FIG. 1 may be a plug-in to the user's development environment 112, a plug-in to a build and deploy tool, or any other process that can access the API specification and source code 118 and send requests to a service provider system 100. To initiate the migration process, a user 134 may, for example, select a menu option, button, or other interface component of a development environment 112. The received input may include an identification of a location of the web service implementation 114 (for example, a project folder or other storage location of the API specification 116 and source code 118) or the location of the web service implementation may be automatically identified (for example, based on the web service implementation 114 being open for editing in the development environment 112).

In an embodiment, at circle "2," a web service migrator 120 identifies portions of the web service implementation 114 to be migrated to various services of a service provider system 100. For example, the web service migrator 120 can identify an API specification 116 and determine whether the API specification conforms to a format accepted by an API gateway service 106. In one embodiment, if the API specification 116 is in a different format, the web service migrator can convert the API specification 116 to an accepted format (for example, so that the API specification 116 conforms to the Open API format). In other embodiments, if an explicit API specification 116 is not available (for example, for a legacy web service implementation) the web service migrator can derive the API specification 116 information by crawling the web service or performing other operations.

In an embodiment, a web service migrator 120 can also identify portions of source code 118 (or other program code derived from source code 118) to be migrated to a virtual compute service 102. For example, the web service migrator 120 can analyze the structure of source code 118 or code derived from the source code to identify portions of the code suitable for migration as virtual compute service functions 104. The analysis of the web service implementation code can include parsing the source code to determine the structure of the code, generating code dependency graphs, and so forth. In one embodiment, a web service migrator 120 can also package the identified portions of code in a format that is accepted by a virtual compute service 102. The packaging of the identified portions of code to obtain packaged code can include some or all of: identifying dependent code and libraries, modifying portions of the code, generating a project or file structure to store the identified portions of code, generating metadata related to the packaged code, and any other formatting processes so that the code can be migrated to a virtual compute service 102.

In an embodiment, the identification of the portions of code can include identifying code that is referenced by the API specification 116, for example, to identify functions or other code segments that are referenced by particular API endpoints defined by the API specification 116. This information indicating which portions of code are referenced by particular API endpoints of the API specification 116 can also be used to configure the invocation of particular virtual compute service functions 104 responsive to the receipt of requests at an API gateway service 106, as described below.

In an embodiment, the identification of portions of the web service implementation 114 to be migrated to a service provider system 100 can also include identifying auxiliary components of the web service implementation. For example, a web service migrator 120 can identify databases, security certificates, map reduce jobs, or any other components of a web service implementation that can be migrated to various services of a service provider system 100. One or more identified databases, for example, can be migrated to an auxiliary service 108 providing a virtualized database service or a server instance hosting a database server can be migrated to a virtualized hardware service. As described below, a web service migrator 120 can be extensible such that new types of web service component migrations to various services provided by a service provider system 100 can be added over time.

As described in reference to FIG. 2 and FIG. 3 below, although the environment illustrated in FIG. 1 illustrates a web service migration orchestrated by a web service migrator 120 which may be local to a developer of the web service, in other embodiments, the migration process can be orchestrated by a remote migration service located at the service provider system 100 or elsewhere.

At circles "3A," "3B," and "3C," responsive to the input requesting the migration of the web service implementation 114 to the service provider system 100 and the identification of portions of the web service implementation 114 to be migrated at circle "2," the web service migrator 120 generates requests to various services of the service provider system 100 to migrate the API specification 116, source code 118 (or code derived from source code 118), and possibly other components of the web service implementation 114. In an embodiment, the automated migration of the web service implementation 114 to an execution environment provided by the service provider system 100 enables the web service to be executed by computing resources of the service provider system 100 instead of, for example, by computing resources locally provisioned and managed by the user 134.

In an embodiment, at circle "3A," the web service migrator 120 sends an API specification migration request 128 to an API gateway service 106. For example, the web service migrator 120 can access the API specification 116 and send the API specification to the API gateway service 106 as part of the API specification migration request 128. The API gateway service 106 may include an import tool that enables the API gateway service 106 to receive an API specification 116 and to generate one or more API endpoints based on the specification. As indicated above, each API endpoint may correspond to a unique URL or other identifier of a resource provided by the web service. In some embodiments, the generation of an API specification migration request 128 may include the conversion of the API specification 116 into a format accepted by the API gateway service 106 if it is determined that the API specification 116 is in a different format. In other embodiments, the web service migrator 120 may parse the API specification 116, identify one or more endpoints defined in the specification, and send one or more separate requests to the API gateway service 106 to replicate the defined API endpoints.

In an embodiment, at circle "3B", the web service migrator 120 sends one or more code migration requests 130 to a virtual compute service 102. For example, the web service migrator 120 can access the source code 118 and send the code migration requests 130 to the virtual compute service 102. As indicated above, the code migration requests 130 can include the source code 118 itself, binary code derived from the source code 118, a containerized application derived from the source code 118, other source code or applications related to the source code 118, or combinations thereof.

In one embodiment, the code migration requests 130 can include resource usage information as parameters related to execution of the functions 104 at the virtual compute service 102 (for example, parameters indicating an amount of memory to allocate to a function, a maximum amount of compute time to allow for a function, and so forth). In some embodiments, if the web service migrator determines that the code likely exceeds one or more limits imposed by a virtual compute service 102, the web service migrator 120 can divide the code 118 into two or more separate subportions, one or more of which may be suitable for execution by the virtual compute service 102 on its own. In other examples, portions of source code 118 that are within the virtual compute service's operating constraints may be combined to create a single virtual compute service function 104 replicating the functionality of both portions.

In some embodiments, a monitoring agent can be used to monitor the execution of a web service and to collect utilization metrics related to the performance of the web service. The performance information can be used as part of the process of migrating a web service to a service provider system, for example, to configure virtual compute service functions with resource parameters related to one or more of: CPU power, memory, execution timeouts, and execution permissions. These configurations can be used by a virtual compute service 102, for example, to determine how much CPU, memory, execution time, and so forth, to allocate to the execution of the particular functions. In this manner, the monitoring of a web service and collection of utilization metrics can be used to "right-size" the virtual compute service functions created by a web service migrator 120. In some embodiments, a monitoring agent can be installed at a location which can access and monitor the web service implementation to be migrated (for example, in an application server or web server upon which the web service implementation is running). A monitoring agent can also be installed in a service provider system 100 to monitor the performance of a migrated web service and to refine the resource parameters associated with migrated virtual compute service functions accordingly. In some embodiments, the use of utilization metrics to right-size the creation of virtual compute service functions can be performed automatically as part of the migration process; in other examples, a web service migrator can prompt the user with recommendations based on the monitoring and allow the user to modify or accept the recommended values.

In one embodiment, generating a code migration request 130 based on source code 118 includes packaging the code in a format accepted by the virtual compute service 102. For example, packaging the code may include one or more of the following operations: obtaining a copy of the source code 118 (or a version of the source code modified to operate in the virtual compute service 102), obtaining any code dependencies related to the source code (for example, any libraries and other code upon which the source code 118 depends), creating a file directory structure to store the obtained source code and any dependencies, creating a storage location at the service provider system to store the packaged code, uploading the packaged code to the created storage location. In one embodiment, the generation of a code migration request 130 may involve packaging any code dependencies and libraries for each function to be created individually; in other embodiments, some code dependencies and libraries can be packaged as a separate collection and used by multiple virtual compute service functions 104 at the virtual compute service 102.

In one embodiment, the identification of code dependencies related to the source code 118 can be based at least in part on the generation of a dependency graph. A dependency graph generally is a representation of relationships between various portions of the source code or between portions of binary code derived from the source code. A dependency graph can be used by a web service migrator 120 or other component to determine, for example, whether the source code 118 depends on any other source code, libraries, and so forth to be included in the code migration request(s) 130. The dependency graph can be generated, for example, by a build and deploy tool or other process with access to the source code 118 or program code derived from source code 118.

In an embodiment, the creation of one or more of the virtual compute service functions 104 can include configuring the functions to be triggered by one or more auxiliary services 108. For example, if a portion of the source code 118 is configured to perform one or more operations in response to data being stored at a storage virtualization service, a corresponding virtual compute service function 104 may be created and configured to be invoked whenever data is stored in the storage virtualization service (as described above, by configuring the virtual compute service function to be triggered by events generated by the storage virtualization service).

In an embodiment, the creation of one or more virtual compute service functions 104 can include creating two or more functions that pass control flow from one function to another during execution. For example, one or more portions of source code 118 may be converted into two or more separate virtual compute service functions that use a message queuing system or other mechanism for passing control flow from one function to another, and back to the refactored source code, when appropriate.

In an embodiment, at circle "3C," the web service migrator 120 optionally sends one or more auxiliary component migration requests 132 to one or more auxiliary services 108. For example, if the web service implementation 114 includes one or more databases used by the web service during operation, the web service migrator 120 may create a snapshot of the database and send the snapshot to a virtualized database service of the service provider system 100, migrate an instance of a database server to a compute instance provided by the service provider system 100, or migrate a VM hosting the database server to a VM service of the service provider system 100. As another example, if a web service implementation 114 includes the configuration of a digital certificate associated with a web server hosting the web service, the web service migrator 120 may send a request to a digital certificate management service to replicate the digital certificate configuration at the service provider system 100. Other examples of web service components that can be migrated to services provided by a service provider system 100 include, but are not limited to, the migration of map reduce jobs to a map reduce service and the migration of a cache implementation to an in-memory data store and cache service. In an embodiment, the source code migrated to the virtual compute service 102 can be configured to access any auxiliary resources migrated to auxiliary service 108 (for example, to connect to a database migrated to a database virtualization service) to replicate the full operation of the web service at the service provider system 100.

Figure 2:
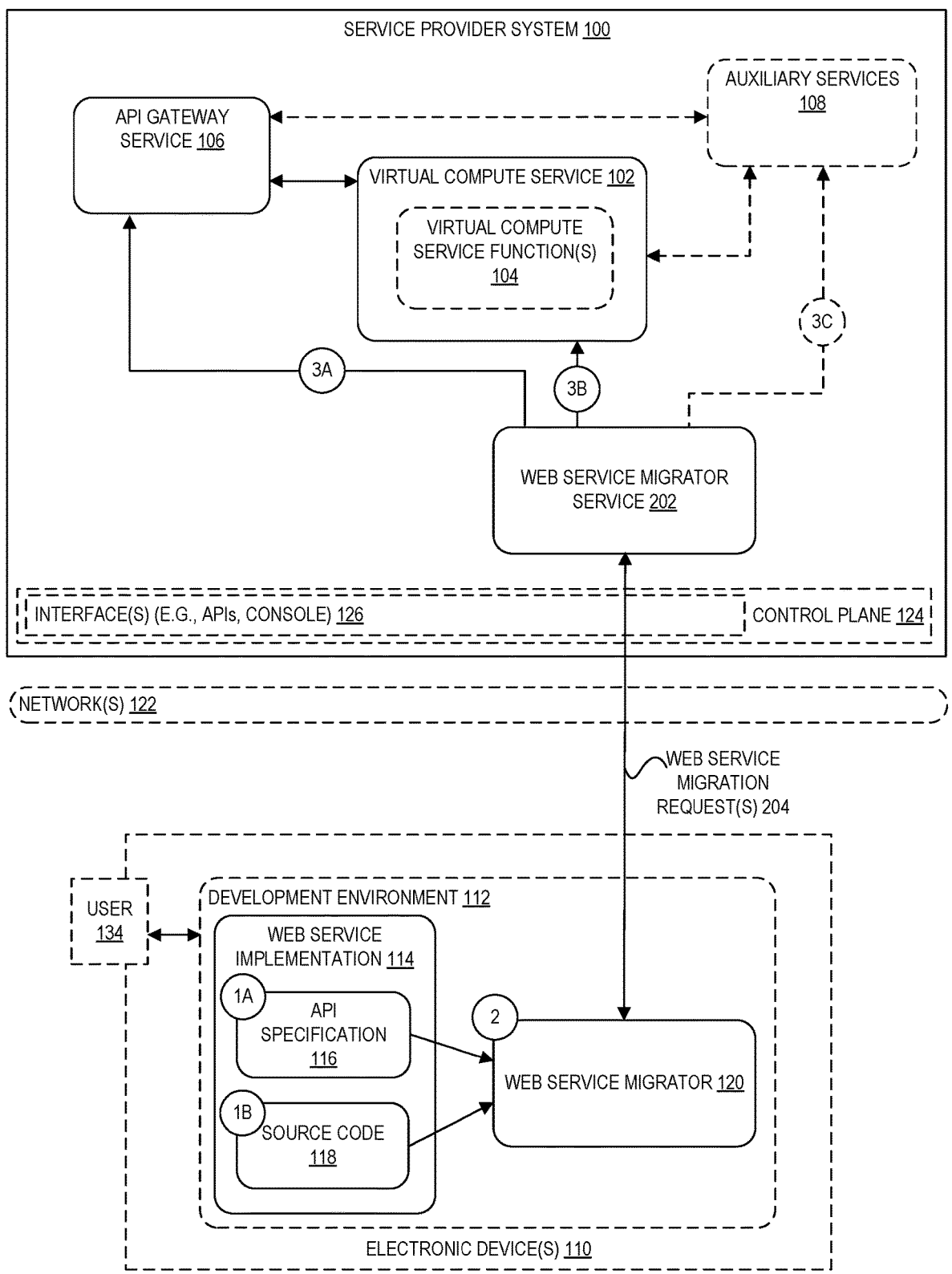
FIG. 2 is a diagram illustrating an environment including a migrator service of a service provider system used to migrate a web service implementation to an execution environment provided by the service provider system, according to some embodiments.

FIG. 2 is a block diagram illustrating another example environment including components used to automatically migrate a web service implementation to a service provider system. Similar to FIG. 1, a virtual compute service 102, an API gateway service 106, and possibly other auxiliary services 108 operate as part of a service provider system 100. In FIG. 2, a service provider system 100 further includes a web service migrator service 202 that can be used to coordinate the migration of a web service implementation 114 in connection with web service migrator 120.

Similar to FIG. 1, the circles labeled "1A" and "1B" in FIG. 2 show an API specification 116 and source code 118, which may have been developed by a user 140 using a development environment 112 (which may be part of a user's local computing environment or provided by one or more services of a service provider system 100). In one embodiment, at circle "2," a web service migrator 120 sends one or more web service migration requests 204 to the web service migrator service 202 (for example, in response to input from a user 134 requesting the migration of the web service implementation 114). As described in relation to FIG. 1, the web service migrator 120 can perform one or more operations to identify components of the web service implementation 114 to be migrated to the service provider system 100. For example, the web service migrator 120 can identify an API specification 116 defining endpoints of the web service implementation, parse/analyze the source code 118 to identify portions of the code to replicate with one or more virtual compute service functions 104, identify other auxiliary components such as databases, digital certificates, and so forth.

In FIG. 2, instead of the web service migrator 120 sending requests to several separate services of the service provider system 100 to replicate the identified components of the web service implementation 114, the web service migrator 120 can send one or more requests directly to the web service migrator service 202 and the service 202 can then manage the replication processes at the service provider system 100 (for example, by sending requests to the API gateway service 106, virtual compute service 102, auxiliary services 108, and so forth, to replicate components of the web service delivered by the web service migrator 120). A web service migration request 204, for example, can include some or all of: a copy of the API specification 116, source code 118 (or binary code derived from source code 118, packaged code, or any other code), and any other information that can be used by the web service migrator service 202 to replicate identified components of the web service implementation 114 at the service provider system 100.

In some embodiments, the web service migrator 120 may send an initial request to the web service migrator service 202 indicating the desire to perform the migration and the web service migrator service 202 can send one or more requests back to the web service migrator 120 instructing the migrator to obtain and send various data to the service 202. For example, a web service migrator service 202 may send requests back to the web service migrator 120 instructing the migrator to obtain and send the API specification 116, to obtain and package the source code 118 in a particular format, and to perform any other data gathering operations. The web service migrator service 202 can use the requested data obtained from the web service migrator 120 to replicate the obtained components of the web service at various services of the service provider system 100. For example, at circles "3A," "3B," and "3C," the web service migrator service 202 can send separate requests to each of the API gateway service 106, virtual compute service 102, and one or more auxiliary services 108 to replicate the various components of the web service implementation 114 at the service provider system 100.

Figure 3:
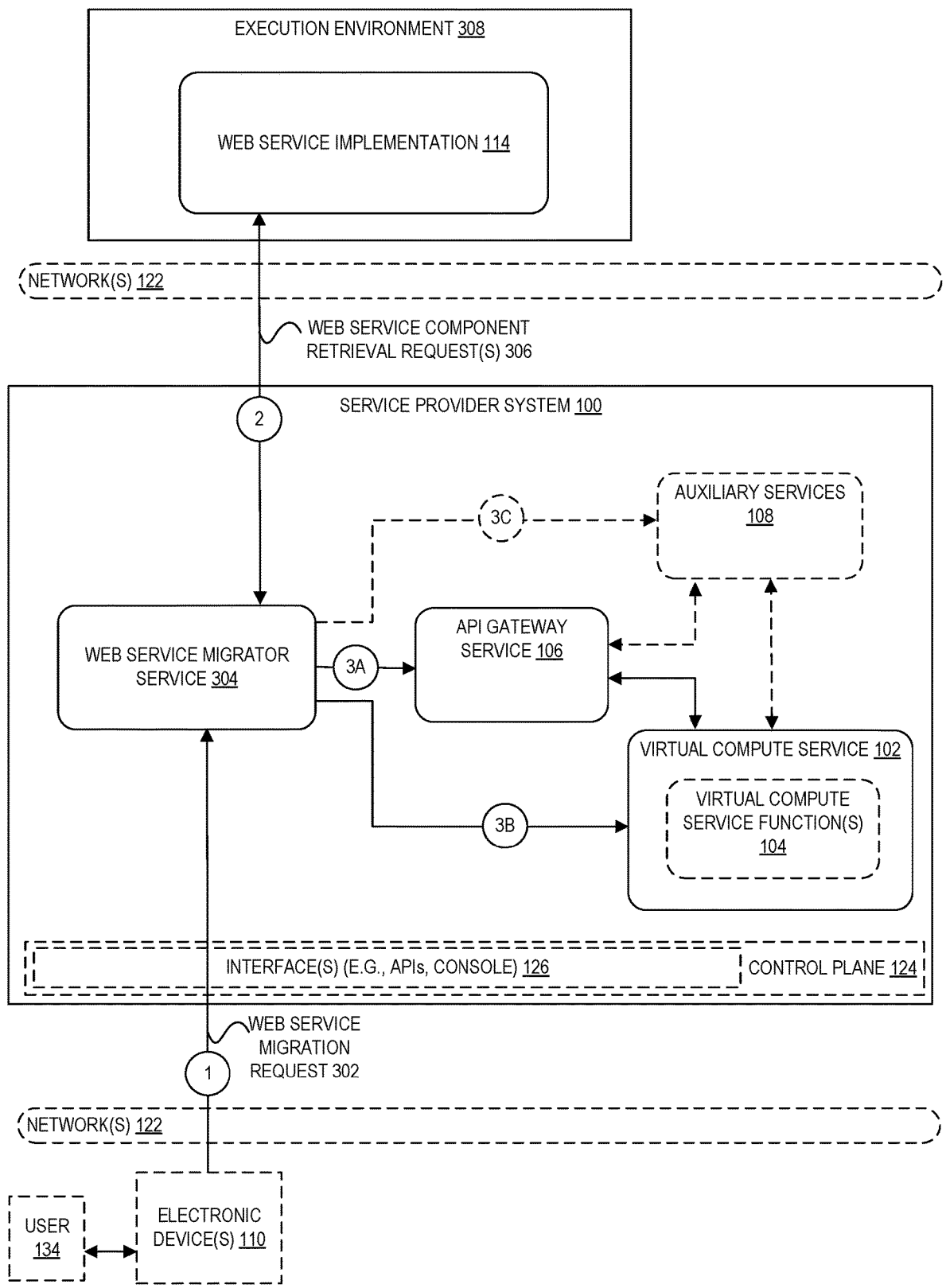
FIG. 3 is a diagram illustrating another environment including a migrator service of a service provider system used to migrate a web service implementation to an execution environment provided by the service provider system, according to some embodiments.

FIG. 3 is a block diagram illustrating yet another example environment including components used to automatically migrate a web service implementation to a service provider system. The environment shown in FIG. 3 includes a web service implementation 114 in an execution environment 308 and a web service migrator service 304, virtual compute service 102, API gateway service 106, and auxiliary services 108 operating as part of a service provider system 100. The execution environment 308 in FIG. 3, for example, may represent an on-premises environment associated with the user 134, a service provider system that is different from service provider system 100, a separate portion of the service provider system 100, or any other environment at which a web service implementation 114 may exist. The environment illustrated by FIG. 3, for example, shows that a web service migrator service 304 of a service provider system 100 can be used to migrate a web service implementation 114 that exists at virtually any location.

In an embodiment, at circle "1" in FIG. 3, a user 134 uses an electronic device 110 to send a web service migration request 302 to the web service migrator service 304. For example, a user may access a web-based form generated by the web service migrator service 304 and provide input identifying the location of the web service implementation 114, API specification 116, source code 118, and any other relevant components of the web service implementation 114. The user may further provide credentials (for example, a username and password) that enable the web service migrator service 304 to access the identified web service components. If the web service implementation 114 exists in a separate service provider system, for example, the credentials may comprise account information with permissions sufficient to access and obtain the components of the web service implementation 114 from the execution environment 308.

In an embodiment, at circle "2" in FIG. 3, the web service migrator service 304 sends one or more web service component retrieval requests 306. For example, the requests 306 can be used to obtain information related to the various components of the web service implementation 114, including the API specification 116, source code 118 (or code derived from source code 118), and other possible components. As indicated above, the requests can be sent to any location where the web service implementation 114 exists such as, for example, a customer's on-premises environment, a service provider system that is different from system 100, or any other location.

In an embodiment, the process of a web service migrator service 304 sending web service component retrieval requests 306 can include identifying portions of the web service implementation 114 to be migrated. For example, the web service migrator can send requests to access an API specification, code, and other components of the web service implementation, and parse/analyze the structure of the code (if the code is accessible), analyze the API specification (if accessible), crawl the web service to automatically identify API endpoints and to identify response information, and so forth.

In an embodiment, at circles "3A," "3B," and "3C," the web service migrator service 304 sends requests to the API gateway service 106, virtual compute service 102, and auxiliary services 108 based on the information obtained from the web service component retrieval requests 306. In this manner, a web service implementation 114 can be migrated into a service provider system 100 independent of any particular development environment and execution environment at which the implementation currently exists.

As indicated above, in some examples, a web service implementation 114 may not include an explicit API specification that can be obtained in a standardized format. For example, some legacy web service implementations may have been developed prior to the advent of API specification standards or the API specification for a web service might not be accessible. In some embodiments, a component used to migrate a web service implementation can crawl a web service implementation to automatically generate an API specification when a specification is not otherwise available. For example, the migrator component may crawl known paths of the web service and examine the responses received from the web service in response to various types of requests at each path. The information obtained from crawling the web service can be used by the migrator component to infer attributes of the API (for example, endpoints, operation parameters, and so forth) for the web service and to generate an API specification file or other data representing the API which can be used to migrate the API to a service provider system 100.

In an embodiment, a web service migrator is extensible and allows developers to add functionality to the migrator so that components of a web service implementation can be migrated to new services of the service provider system 100 or so that the processes used to migrate components of the web service to existing services can be extended. For example, a web service migrator 120 may be designed to support plug-ins that allow developers to customize the way in which web service implementations are migrated into a service provider system.

Figure 4:
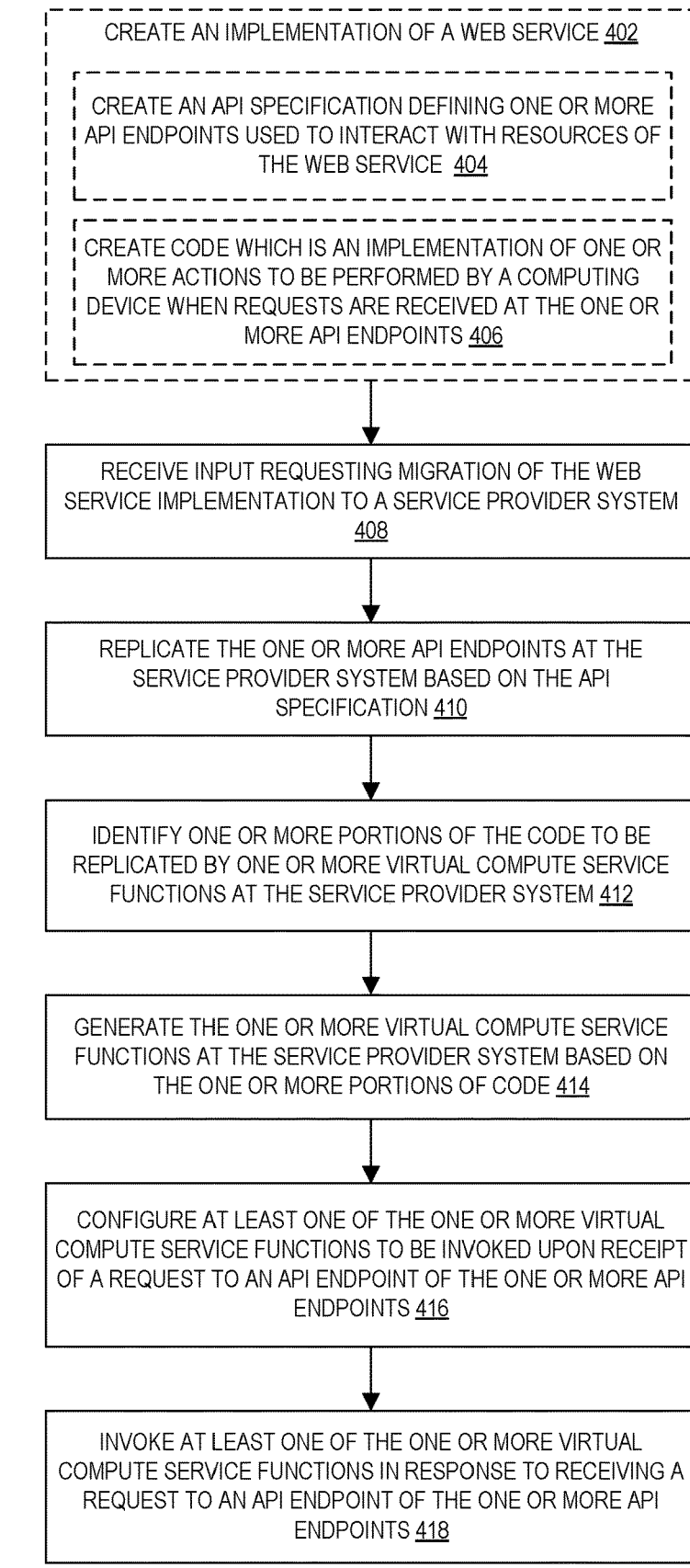
FIG. 4 is a flow diagram illustrating operations for migrating a web service implementation to an execution environment provided by a service provider system, according to some embodiments.

For further details of a process for migrating code and metadata defining a web service implementation to a service provider system, FIG. 4 is a flow diagram illustrating operations 400. Some or all of the operations 400 (or other processes described herein, or variations, or combinations thereof) are performed under the control of one or more computer systems configured with executable instructions and are implemented as code (for example, executable instructions, one or more computer programs, or one or more applications) executing collectively on one or more processors by hardware or combinations thereof. The code can be stored on a computer-readable storage medium, for example, in the form of a computer program comprising instructions executable by one or more processors. The computer-readable storage medium is non-transitory. In some embodiments, one or more (or all) of the operations 400 are performed by electronic device(s) 110, which may be part of or separate from a service provider system 100.

In some embodiments, the operations 400 include, at block 402, creating an implementation of a web service. For example, the creation of a web service implementation can include, at block 404, the creation of an API specification defining API endpoints of the web service and, at block 406, the creation of code which is an implementation of one or more actions to be performed by a computing device when requests are received at the one or more API endpoints. Referring again to FIG. 1, for example, a user 134 can use a development environment 112 to create a web service implementation 114. In an embodiment, the creation of a web service implementation can include the creation of an API specification 116, for example, based on the OpenAPI specification format. The API specification 116 may be used by a code generation tool to generate some or all of source code 118, or the source code 118 can be developed independently of the API specification 116. In an embodiment, the source code 118 includes business logic of the web service implementation and specifies actions to be performed responsive to requests being received at the API endpoints. In some embodiments, a web service implementation 114 can further include one or more databases or other data sources that are used to store data used by the web service to service requests. A web service implementation 114 may also include a digital certificate, for example, associated with a web server initially hosting the web service and used to enable secure interactions with the web service using the Transport Layer Security (TLS), Secure Sockets Layer (SSL), or other protocol.

At block 408, input is received requesting migration of a web service implementation (for example, the web service implementation created at block 402) to a service provider system. For example, a user 134 may select an interface element of an IDE, a source code editor, a web-based interface for a migration service of a service provider system, or perform any other operation that causes a web service migrator 120 to initiate the migration process. In some embodiments, the input may include an identifier of a location of the web service implementation (for example, a project folder, a URL identifying the web service at a different service provider system, or other location identifier), or the location of the web service implementation may be identified automatically be the web service migrator 120.

At block 410, one or more API endpoints of the web service implementation are replicated at the service provider system. For example, responsive to the input received at block 408, a web service migrator 120 or a web service migrator service 304 may send one or more API specification migration requests 128 to an API gateway service 106 of a service provider system 100. In one embodiment, an API specification migration request 128 includes sending an API specification 116 defining one or more API endpoints and that is used by the API gateway service 106 to replicate the one or more API endpoints at the API gateway service 106. In some embodiments, the sending of the one or more API specification migration requests 128 can include the conversion of an API specification 116 into a format accepted by the API gateway service 106. In other embodiments, the sending of the one or more API specification migration requests 128 can include analyzing an API specification 116, identifying endpoints defined in the specification, and ending individual requests to an API gateway service 106 to replicate the identified endpoints.

In one embodiment, the replication of the one or more API endpoints at the service provider system can include analyzing a running web service to identify the available API endpoints. For example, referring again to FIG. 3, a web service migrator service 304 may identify the endpoints of a web service implementation 114 running in a remote execution environment 308 by crawling the web service or performing other types of analysis. The identified API endpoints can be replicated at the API gateway service 106 by generating an API specification based on the analysis of the web service or by sending individual requests to the API gateway service 106 to create each identified endpoint.

At block 412, one or more portions of the code to be replicated by one or more virtual compute service functions at the service provider system are identified. For example, a web service migrator 120 or a web service migrator service 314 may analyze source code 118 or code derived from the source code 118 to identify one or more separate functions, the functionality of which is to be replicated by virtual compute service functions at a virtual compute service 102. As described above, the identification of functions to be replicated at a virtual compute service 102 can include any of parsing the source code to determine the structure of the code, generating code dependency graphs, identifying portions of code referenced by an API specification, and so forth.

At block 414, the one or more virtual compute service functions are generated at the virtualized compute service based on the one or more identified portions of code, where the virtual compute service automatically provisions and manages computing resources used to execute the one or more virtual compute service functions. In an embodiment, the one or more virtual compute service functions generated at the virtualized compute service are an alternative implementation of the functionality defined by the identified portions of code. These alternative implementations of the functionality at the virtual compute service are based on the identified portions of code and may be based on substantially the same source code or a modified version thereof. For example, the generation of the virtual compute service functions can include sending to a virtual compute service 102 one or more of: a copy of the source code 118, a modified copy of the source code 118, code derived from the source code 118, a binary version of the source code 118, or any other data derived from the source code 118. In one embodiment, the code can be migrated to a virtual compute service 102 such that the service 102 is able to execute the source code in response to events. In other embodiments, executable code derived from the source code 118 (for example, a web server) can be containerized and sent to the virtual compute service 102 for execution as a container.

In one embodiment, generating one or more virtual compute service functions 104 at the service provider system can include identifying code upon which the one or more portions of code depend, packaging the code and dependent code in a format accepted by the virtual compute service 102 to obtain packaged code, and sending the packaged code to the virtual compute service 102 for replication at the service. For the example, the packaged source code may include some or all of source code 118 (or a modified version thereof or binary code derived from the source code) and any dependent libraries or source code external to the one or more portions of code.

In an embodiment, generating the one or more virtual compute service functions 104 can configuring the functions with resource parameters related to execution of one or more virtual compute service functions 104 used to replicate the code 118 at the virtual compute service 102. A request to create a virtual compute service function can include, for example, a name of the virtual compute service function to be created at the virtual compute service 102, an amount of memory to allocate to the function, a timeout for terminating execution of the function, and so forth. One or more of these parameters may be included, for example, as parameters of an API call to the virtual compute service 102. In some embodiments, the resource parameters can be derived from utilization metrics collected by a monitoring agent and indicating performance characteristics of a web service implementation. For example, a monitoring agent can be installed and can collect utilization metrics to determine how much memory, CPU, and other resources are used by each of the one or more portions of code.

In one embodiment, generating the one or more virtual compute service functions can include generating two or more virtual compute service functions for an identified portion of code, wherein at least one of the two or more virtual compute service functions is configured to invoke another of the two or more virtual compute service functions during execution. In this manner, the execution of virtual compute service functions replicating the functionality of the source code 118 can be "chained" together as part of the overall program control flow. This may be useful, for example, if a combination of the two or more virtual compute service functions may exceed execution constraints imposed by a virtual compute service 102, or to make the functions more scalable as independent execution units. In one embodiment, the passing of control flow between two or more virtual compute service functions can be based on a message queuing service to pass control messages or based on any other program control flow mechanism.

At block 416, for at least one of the virtual compute service functions 104 generated at block 414, the virtual compute service function is configured to be invoked upon the receipt of a request at one or more of the API endpoints created at block 410. For example, in one embodiment, one or more requests to an API gateway service 106, virtual compute service 102, or to both, are used to configure at least one of the one or more virtual compute service functions to be invoked upon the receipt of a request to an API endpoint of the one or more API endpoints. For example, an API gateway service 106 can be configured such that requests received at the API endpoints created at block 410 cause invocation of particular virtual service functions created at block 412. For example, the API endpoints may be configured to generate event messages that cause the virtual compute service 102 to invoke one or more particular virtual compute service functions 104 upon the receipt of a request to an API endpoint. A web service migrator can configure particular virtual compute service functions 104 to be invoked in response to requests received at particular API endpoints, for example, based on corresponding configuration identified in the API specification 116 indicating the association between API endpoints and code from the web service implementation 114.

In examples where the code implementing a web service is migrated as a containerized application, the routing of requests to particular backend logic can be largely handled by the application (for example, by a web server, web balancer, or any combination of applications in the container). Thus, in embodiments where a container is used to migrate the source code, a single or a small number of endpoints can be used to route incoming requests to the container and the containerized application can be responsible for routing the requests to the appropriate business logic.

In an embodiment, updates to the metadata, source code, or both, defining the web service implementation 114 can be identified by a web service migrator and, in response, one or more requests can be sent to the corresponding components of the service provider system 100 (or to a web service migrator service) to update any corresponding API endpoints, virtual compute service functions, or both, associated with the updates. For example, a web service migrator 120 may automatically detect when a user has modified source code 118 or the API specification 116, or may detect an update in response to a user requesting a subsequent migration of the web service implementation 114. The updates, for example, may change some of the API endpoints or actions associated with the source code and thus those updates can be reflected in any corresponding API endpoints and virtual compute service functions such that web service implementation 114 and the corresponding migrated implementation at the service provider system 100 stay in sync with one another.

In an embodiment, a web service migrator 120 may be configured to obtain a URL or other identifier of a web service implementation migrated to a service provider system. For example, the obtained URL may be generated by the API gateway service 106, virtual compute service 102, or any other component of the service provider system 100, or by the web service migrator 120. The URL can be used to access the replicated version of the web service implementation at the service provider system, for example, to access resources managed by the web service in manner similar to that if the web server was hosted by locally managed computing resources.

At block 418, at least one of the one or more virtual compute service functions is invoked in response to the receipt of a request to an API endpoint of the one or more API endpoints. For example, using the obtained URL for the web service from the service provider system 100, an application can send a request identifying an API endpoint created at the API gateway service 106 and, in response, a corresponding virtual compute service function 104 can be invoked to process the request (possibly by sending additional requests to one or more auxiliary services 108). In this manner, the migrated version of the web service implementation can now be accessed and operate at the service provider system 100. Referring again to the example of a migrated weather report-related web service, an external application might send a request using the obtained URL and identifying the "/weather" endpoint. The API gateway service 106 receives the request identifying the "/weather" endpoint and causes one or more corresponding virtual compute service functions 104 to be invoked (for example, by sending a message to the virtual compute service 102 indicating receipt of the request). The virtual compute service 102 can then cause the one or more identified virtual compute service functions 104 to be invoked (for example, by automatically provisioning and managing the computing resources used to execute the functions) and the function(s) may generate a data object representing a weather report for a particular location (possibly in assistance with other auxiliary services 108, for example, databases storing current weather information for various geographical locations).

Figure 5:
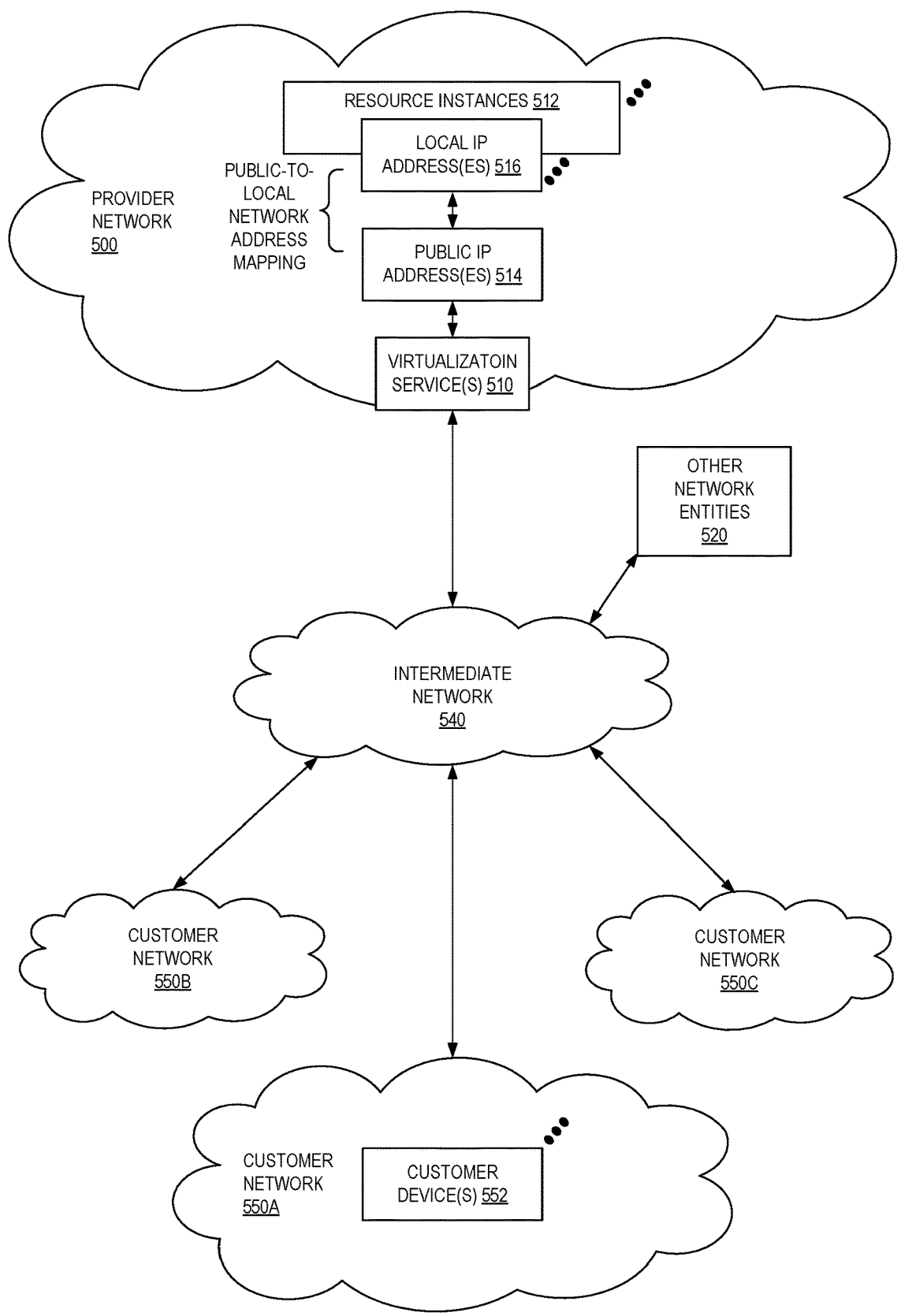
FIG. 5 illustrates an example service provider network environment, according to some embodiments.

FIG. 5 illustrates an example provider network (for example, part of a "service provider system") environment, according to some embodiments. A provider network 500 may provide resource virtualization to customers via one or more virtualization services 510 that allow customers to purchase, rent, or otherwise obtain instances 512 of virtualized resources including, but not limited to, computation and storage resources. The virtualization service 510 can be implemented on devices within the provider network or networks in one or more data centers. Local IP addresses 516 may be associated with the resource instances 512; where the local IP addresses are the internal network addresses of the resource instances 512 on the provider network 500. In some embodiments, the provider network 500 may also provide public IP addresses 514 and/or public IP address ranges (for example, Internet Protocol version 4 (IPv4) or Internet Protocol version 6 (IPv6) addresses) that customers may obtain from the provider network 500.

Conventionally, the provider network 500, via the virtualization services 510, may allow a customer of the service provider (for example, a customer that operates client network 550A) to dynamically associate at least some public IP addresses 514 assigned or allocated to the customer with particular resource instances 512 assigned to the customer. The provider network 500 may also allow the customer to remap a public IP address 514, previously mapped to one virtualized computing resource instance 512 allocated to the customer, to another virtualized computing resource instance 512 that is also allocated to the customer. Using the virtualized computing resource instances 512 and public IP addresses 514 provided by the service provider, a customer of the service provider such as the operator of customer network 550A may, for example, implement customer-specific applications and present the customer's applications on an intermediate network 540, such as the internet. Other network entities 520 on the intermediate network 540 may then generate traffic to a destination public IP address 514 published by the customer network 550A; the traffic is routed to the service provider data center and, at the data center, is routed via a network substrate to the local IP address 516 of the virtualized computing resource instance 512 currently mapped to the destination public IP address 514. Similarly, response traffic from the virtualized computing resource instance 512 may be routed via the network substrate back onto the intermediate network 540 to the source entity 520.

Local IP addresses, as used herein, refer to the internal network addresses of resource instances in a provider network. Local IP addresses are only mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are internet mutable network addresses that are assigned to resource instances, either by the service provider or by the customer. Traffic routed to a public IP address is translated, for example, via 1:1 network address translation (NAT), and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 500; a customer may then assign their allocated public IP addresses to particular resource instances allocated to the customer. These public IP addresses may be referred to as customer public IP addresses, or simply customer IP addresses. Instead of being assigned by the provider network 500 to resource instances as in the case of standard IP addresses, customer IP addresses may be assigned to resource instances by the customers, for example, via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 6:
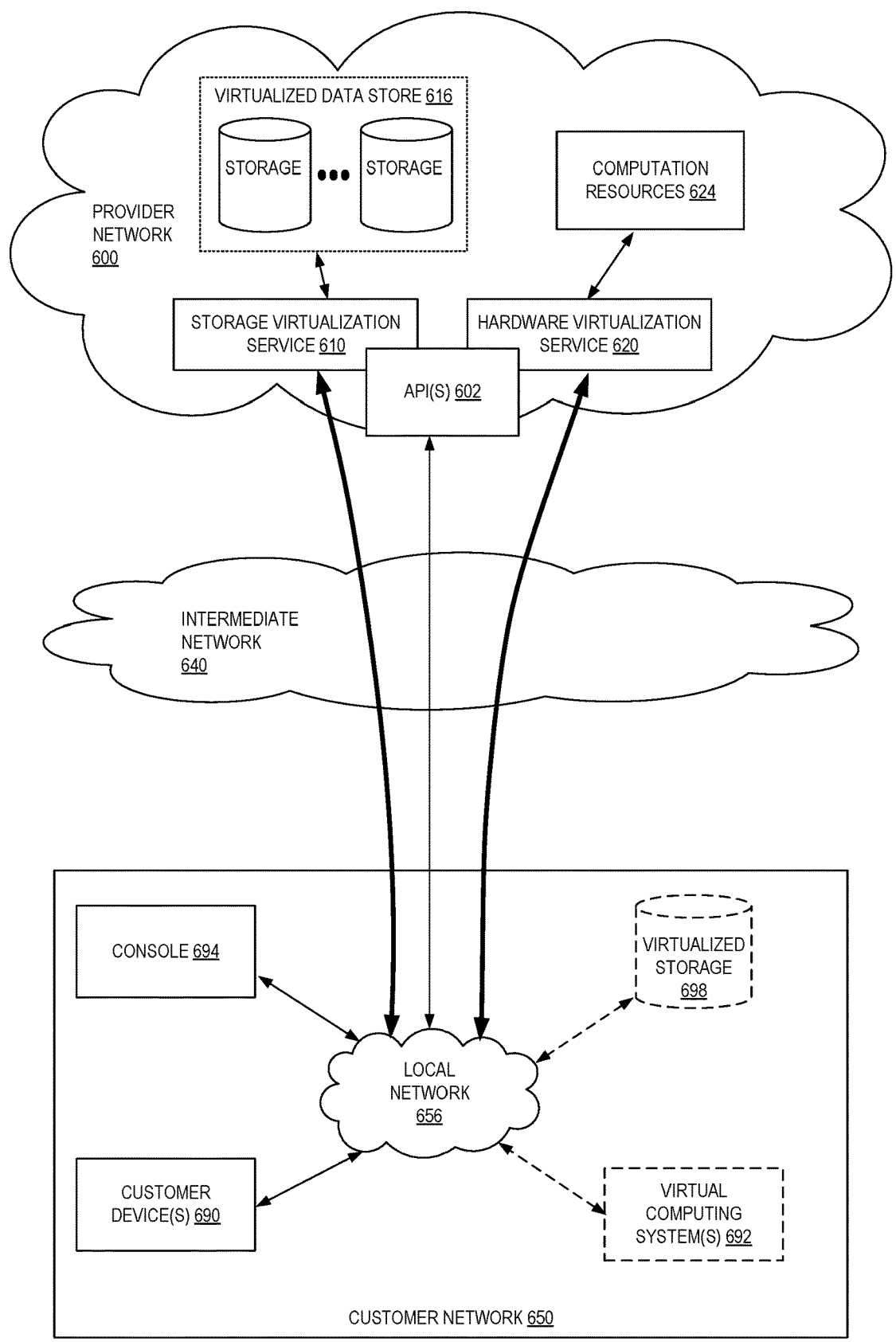
FIG. 6 is a block diagram of an example service provider network that provides a storage virtualization service and a hardware virtualization service to customers, according to some embodiments.

FIG. 6 is a block diagram of an example provider network that provides a storage virtualization service and a hardware virtualization service to customers, according to some embodiments. Hardware virtualization service 620 provides multiple computation resources 624 (for example, VMs) to customers. The computation resources 624 may, for example, be rented or leased to customers of the provider network 600 (for example, to a customer that implements customer network 650). Each computation resource 624 may be provided with one or more local IP addresses. Provider network 600 may be configured to route packets from the local IP addresses of the computation resources 624 to public Internet destinations, and from public Internet sources to the local IP addresses of computation resources 624.

Provider network 600 may provide a customer network 650, for example, coupled to intermediate network 640 via local network 656, the ability to implement virtual computing systems 692 via hardware virtualization service 620 coupled to intermediate network 640 and to provider network 600. In some embodiments, hardware virtualization service 620 may provide one or more APIs 602, for example, a web services interface, via which a customer network 650 may access functionality provided by the hardware virtualization service 620, for example, via a console 694. In some embodiments, at the provider network 600, each virtual computing system 692 at customer network 650 may correspond to a computation resource 624 that is leased, rented, or otherwise provided to customer network 650.

From an instance of a virtual computing system 692 and/or another customer device 690 or console 694, the customer may access the functionality of storage virtualization service 610, for example, via one or more APIs 602, to access data from and store data to a virtual data store 616 provided by the provider network 600. In some embodiments, a virtualized data store gateway (not shown) may be provided at the customer network 650 that may locally cache at least some data, for example, frequently accessed or critical data, and that may communicate with virtualized data store service 610 via one or more communications channels to upload new or modified data from a local cache so that the primary store of data (virtualized data store 616) is maintained. In some embodiments, a user, via a virtual computing system 692 and/or on another customer device 690, may mount and access virtual data store 616 volumes, which appear to the user as local virtualized storage 698.

While not shown in FIG. 6, the virtualization service(s) may also be accessed from resource instances within the provider network 600 via API(s) 602. For example, a customer, appliance service provider, or other entity may access a virtualization service from within a respective virtual network on the provider network 600 via an API 602 to request allocation of one or more resource instances within the virtual network or within another virtual network.

Illustrative System

Figure 7:
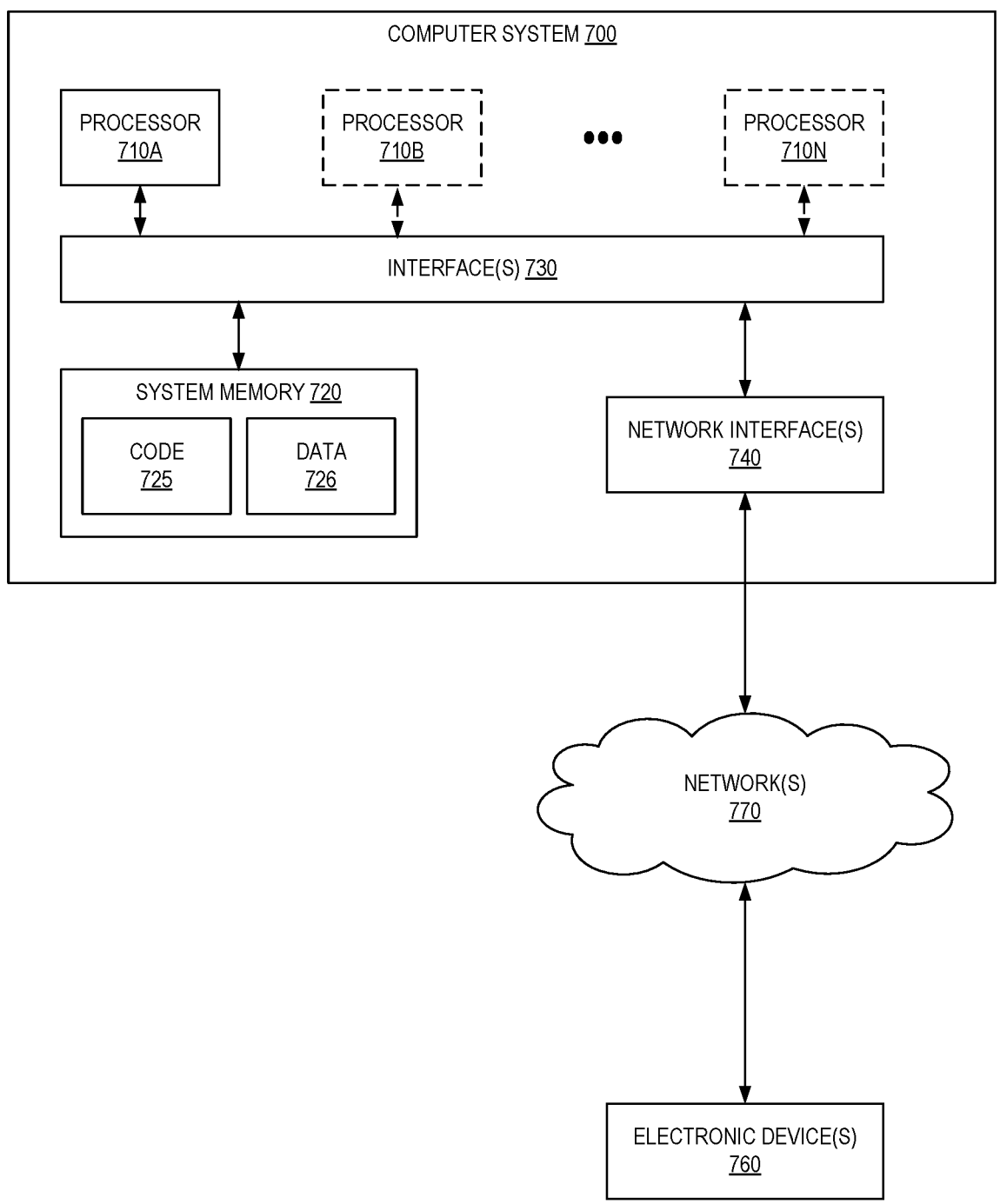
FIG. 7 is a block diagram illustrating an example computer system that may be used in some embodiments.

In some embodiments, a system that implements a portion or all of the techniques for self-organizing server migration to service provider system environments as described herein may include a general-purpose computer system that includes or is configured to access one or more computer-accessible media, such as computer system 700 illustrated in FIG. 7. In the illustrated embodiment, computer system 700 includes one or more processors 710 coupled to a system memory 720 via an input/output (I/O) interface 730. Computer system 700 further includes a network interface 740 coupled to I/O interface 730. While FIG. 7 shows computer system 700 as a single computing device, in various embodiments a computer system 700 may include one computing device or any number of computing devices configured to work together as a single computer system 700.

In various embodiments, computer system 700 may be a uniprocessor system including one processor 710, or a multiprocessor system including several processors 710 (for example, two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA In multiprocessor systems, each of processors 710 may commonly, but not necessarily, implement the same ISA.

System memory 720 may store instructions and data accessible by processor(s) 710. In various embodiments, system memory 720 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 720 as code 725 and data 726.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (for example, system memory 720) into a format suitable for use by another component (for example, processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices 760 attached to a network or networks 750, such as other computer systems or devices as illustrated in FIG. 1, for example. In various embodiments, network interface 740 may support communication via any suitable wired or wireless general data networks, such as types of Ethernet network, for example. Additionally, network interface 740 may support communication via telecommunications/telephony networks such as analog voice networks or digital fiber communications networks, via storage area networks such as Fibre Channel SANs, or via I/O any other suitable type of network and/or protocol.

In some embodiments, system memory 720 may be one embodiment of a computer-accessible medium configured to store program instructions and data for implementing a server migration service in a provider network environment. However, in other embodiments, program instructions and/or data may be received, sent or stored upon different types of computer-accessible media. Generally speaking, a computer-accessible medium may include non-transitory storage media or memory media such as magnetic or optical media, for example, disk or DVD/CD coupled to computer system 700 via I/O interface 730. A non-transitory computer-accessible storage medium may also include any volatile or non-volatile media such as RAM (for example, SDRAM, double data rate (DDR) SDRAM, SRAM, etc.), read only memory (ROM), etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

Various embodiments may further include receiving, sending, or storing instructions and/or data implemented in accordance with the foregoing description upon a computer-accessible medium. A computer-accessible medium may include storage media or memory media such as magnetic or optical media, for example, disk or DVD/CD-ROM, volatile or non-volatile media such as RAM (for example, SDRAM, DDR, RDRAM, SRAM, etc.), ROM, etc., as well as transmission media or signals such as electrical, electromagnetic, or digital signals, conveyed via a communication medium such as network and/or a wireless link.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (for example, large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in some embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The various methods as illustrated in the figures and described herein represent exemplary embodiments of methods. The methods may be implemented in software, hardware, or a combination thereof. The order of the methods may be changed, and various elements may be added, reordered, combined, omitted, modified, etc. Thus, various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer-implemented method comprising:
   receiving, by a web service migrator, input requesting migration of a web service implementation hosted in a computing environment outside of a service provider system to resources provided by the service provider system, wherein the input includes an identifier of a location of the web service implementation, and wherein the web service implementation includes:
      a file defining a first plurality of application programming interface (API) endpoints of the web service, and
      source code defining actions to be performed responsive to requests at the first plurality of API endpoints;
   sending, to an API gateway service of the service provider system, a request to create a second plurality of API endpoints based on the file defining the first plurality of API endpoints;
   identifying a portion of the source code to be replicated by a virtual compute service function at the service provider system, the service provider system to automatically provision and manage computing resources used to execute the one or more virtual compute service functions;
   sending, to a virtual compute service of the service provider system, a request to create the virtual compute service function based on the portion of the source code;
   configuring the virtual compute service function to be invoked upon receipt of a request at an API endpoint of the second plurality of API endpoints; and
   invoking the virtual compute service function in response to receiving the request at the API endpoint of the second plurality of API endpoints.

2. The computer-implemented method of claim 1, wherein the web service implementation further includes a database, and wherein the method further comprises sending, to a database service of the service provider system, a request to create a replicated copy of the database at the service provider system.

3. The computer-implemented method of claim 1, further comprising:

packaging the portion of the source code in a format accepted by the virtual compute service to obtain packaged source code; and using the packaged source code to create the virtual compute service function at the virtual compute service.

4. A computer-implemented method comprising:

receiving, by a web service migrator, input requesting migration of a web service implementation hosted in an environment outside of a service provider system to resources provided by the service provider system, wherein the input includes an identifier of a location of the web service implementation, and wherein the web service implementation includes:

metadata defining a first plurality of application programming interface (API) endpoints of the web service, and source code defining actions to be performed responsive to requests received at the first plurality of API endpoints;

sending, to an API gateway service of the service provider system, a request to create a second plurality of API endpoints based on the metadata defining the first plurality of API endpoints;

identifying a portion of the source code to be replicated by a virtual compute service function at the service provider system;

sending, to a virtual compute service of the service provider system, a request to create the virtual compute service function based on the portion of the source code; and configuring the virtual compute service function to be invoked upon receiving a request at an API endpoint of the second plurality of API endpoints.

5. The computer-implemented method of claim 4, wherein the web service implementation includes a database, and wherein the method further comprises causing sending, to a database service of the service provider system, a request to create a replicated copy of the database at the service provider system.

6. The computer-implemented method of claim 4, wherein the web service migrator is a component of a development environment used to create the web service implementation.

7. The computer-implemented method of claim 4, wherein the request to create the second plurality of API endpoints and the request to create the virtual compute service function is sent by a migrator service provided by the service provider system.

8. The computer-implemented method of claim 4, wherein the web service implementation includes a configuration of a digital certificate, and the method further comprises replicating the configuration of the digital certificate at a digital certificate management service of the service provider system.

9. The computer-implemented method of claim 4, further comprising:

converting at least a portion of the metadata to an API specification format accepted by the API gateway service of the service provider system to generate a converted API specification; and wherein the API gateway service uses the converted API specification to create the second plurality of API endpoints.

10. The computer-implemented method of claim 4, further comprising:

monitoring execution of the web service implementation to obtain utilization metrics; and configuring the virtual compute service function with resource parameters based on the utilization metrics, wherein the resource parameters relate to one or more of: memory size, central processing unit (CPU) power, execution timeout, or execution permissions.

11. The computer-implemented method of claim 4, further comprising:

detecting an update to the source code of the web service implementation; and updating the virtual compute service function based on the update to the source code.

12. The computer-implemented method of claim 4, further comprising:

detecting an update to the metadata; and updating at least one of the second plurality of API endpoints at the service provider system based on the update to the metadata.

13. The computer-implemented method of claim 4, further comprising:

identifying dependent code upon which the source code depends;

packaging the source code and dependent code in a format accepted by the virtual compute service to obtain packaged code; and wherein the virtual compute service uses the packaged code to create the virtual compute service function at the service provider system.

14. The computer-implemented method of claim 4, further comprising receiving a Uniform Resource Locator (URL) that can be used to access a replicated version of the web service implementation at the service provider system.

15. The computer-implemented method of claim 4, wherein portions of the source code are automatically generated by a code generation tool based on the metadata defining the first plurality of API endpoints.

16. The computer-implemented method of claim 4, further comprising generating the metadata by crawling the web service implementation to identify the first plurality of API endpoints.

17. A non-transitory computer-readable storage medium storing instructions which, when executed by one or more processors of one or more computing devices, cause the one or more computing devices to:

receive input requesting migration of a web service implementation hosted in a computing environment outside of a service provider system to resources provided by the service provider system, wherein the input includes an identifier of a location of the web service implementation, and wherein the web service implementation includes:

metadata defining a first plurality of application programming interface (API) endpoints of the web service, and source code defining actions to be performed responsive to requests received at the first plurality of API endpoints;

send, to an API gateway service of the service provider system, a request to create a second plurality of API endpoints based on the metadata defining the first plurality of API endpoints;

identify a portion of the source code to be replicated by a virtual compute service function at the service provider system;

send, to a virtual compute service of the service provider system, a request to create the virtual compute service function based on the portion of the source code; and configure the virtual compute service function to be invoked upon receiving a request at an API endpoint of the second plurality of API endpoints.

18. The non-transitory computer-readable storage medium of claim 17, wherein the web service implementation includes a database, and wherein the instructions further cause the one or more computing devices to send, to a database service of the service provider system, a request to create a replicated copy of the database at the service provider system.

19. The non-transitory computer-readable storage medium of claim 17, wherein the web service implementation includes a configuration of a digital certificate, and wherein the instructions further cause the one or more computing devices to replicate the configuration of the digital certificate at a digital certificate management service of the service provider system.

20. The non-transitory computer-readable storage medium of claim 17, wherein the instructions further cause the one or more computing devices to:

convert at least a portion of the metadata to an API specification format accepted by the API gateway service of the service provider system to generate a converted API specification; and wherein the API gateway service uses the converted API specification to create the second plurality of API endpoints.

* * * * *